Oct. 23, 1934. W. C. MULLER Re. 19,349
PUMP OR MOTOR FOR HYDRAULIC TRANSMISSION SYSTEMS
Original Filed Aug. 19, 1930 3 Sheets-Sheet 1
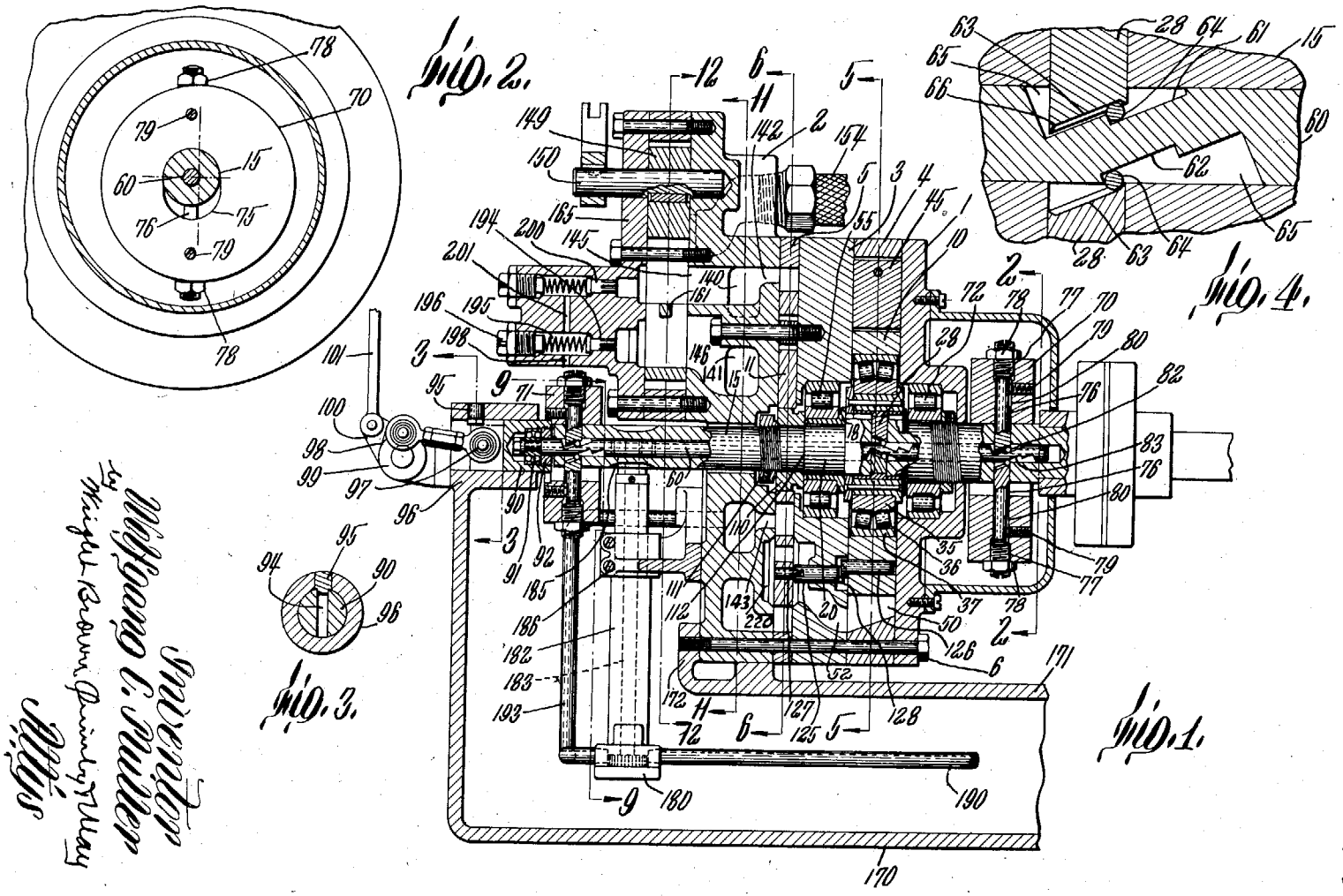
Inventor
Wolfgang C. Muller
by Wright Brown Quinby & May
Attys PUMP OR MOTOR FOR HYDRAULIC TRANSMISSION SYSTEMS
Original Filed Aug. 19, 1930 3 Sheets-Sheet 2
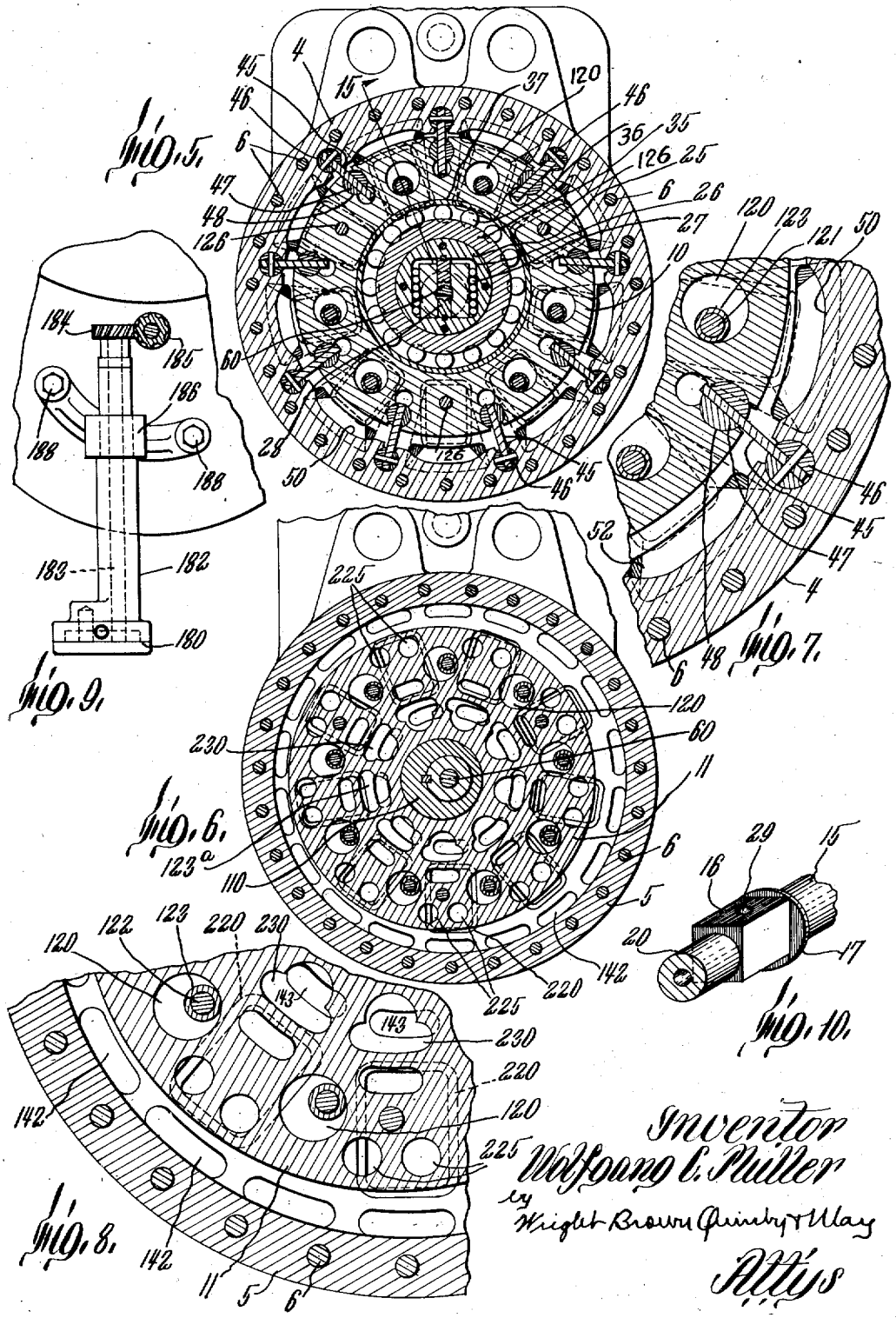
Inventor
Wolfgang C. Muller
by Wright Brown Quinby & Clay
Attys Oct. 23, 1934. W. C. MULLER Re. 19,349
PUMP OR MOTOR FOR HYDRAULIC TRANSMISSION SYSTEMS
Original Filed Aug. 19, 1930 3 Sheets-Sheet 3
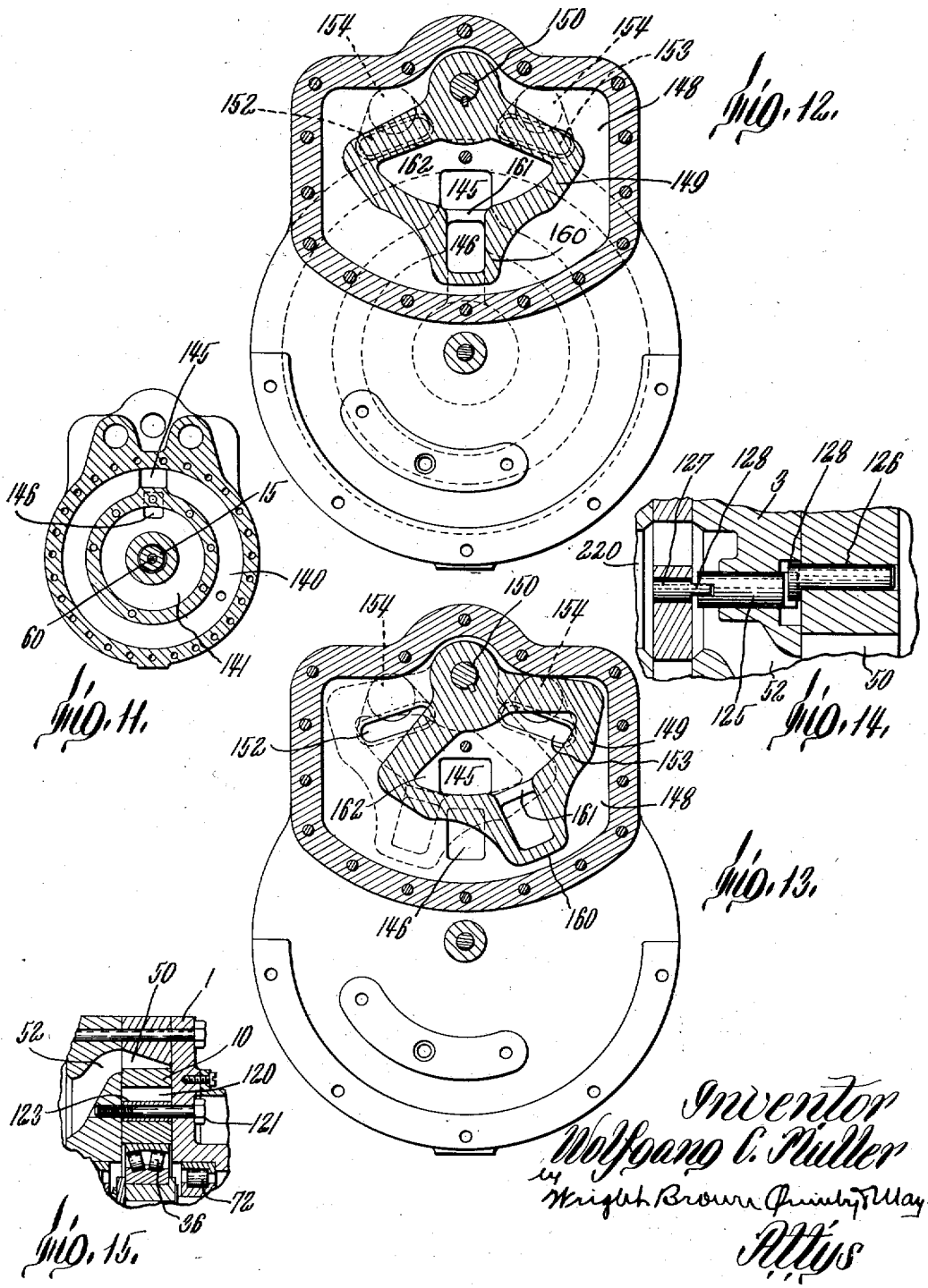
Inventor
Wolfgang C. Muller
by Wright Brown Quinby & May
Attys Reissued Oct. 23, 1934

Re. 19,349

UNITED STATES PATENT OFFICE 19,349

PUMP OR MOTOR FOR HYDRAULIC TRANSMISSION SYSTEMS

Wolfgang C. Muller, Milwaukee, Wis.

Original No. 1,935,096, dated November 14, 1933, Serial No. 476,315, August 19, 1930. Application for reissue July 2, 1934, Serial No. 734,001

13 Claims. (Cl. 103—38)

This invention relates to pumps or motors more particularly designed for use as parts of hydraulic power transmission mechanisms of the general type illustrated in Patent No. 1,961,592, such mechanism including a pump and a motor each having moving and eccentric parts.

One object of this invention is to provide improved means for varying the eccentricities of certain of such parts.

Another object is to counterbalance such parts so that no vibration of the mechanism when in operation may be produced.

Another object is to hydrostatically balance the valve structure to permit it to be easily operated and to reduce wear to a minimum.

Another object is to provide improved means for preventing rotation about its axis of certain of the eccentrically moving members.

Further objects and advantages will appear from a description of an embodiment of the invention shown in the accompanying drawings in which Figure 1 is a central vertical section through a pump embodying the invention.

Figures 2 and 3 are sections on lines 2—2 and 3—3, respectively, of Figure 1.

Figure 4 is an enlarged detail view of a part of the displacement varying mechanism.

Figures 5 and 6 are sections on lines 5—5 and 6—6, respectively, of Figure 1.

Figures 7 and 8 are enlarged views of portions of the structures shown, respectively, in Figures 5 and 6.

Figure 9 is a section on line 9—9 of Figure 1.

Figure 10 is a detail in perspective.

Figures 11 and 12 are sections on lines 11—11 and 12—12, respectively, of Figure 1.

Figure 13 is a view similar to Figure 12, but showing the reversing valve in a different position.

Figure 14 is a detail section showing means for preventing rotation of the impeller.

Figure 15 is a detail section on line 15 of Figure 5.

In the drawings, the pump unit has been illustrated, although it should be understood that the motor element may be substantially identical therewith although it will not be necessary in both the motor and pump to provide means for varying the eccentricity of the impeller, means for reversing the valve mechanism, or means for pumping oil into the low pressure side of the system as will later be described and as illustrated in connection with the pump herein shown.

The pump comprises a casing having end walls 1 and 2 and an intermediate partition 3. The partition and end wall 1 are spaced apart by a substantially ring shaped member 4 and the partition 3 and the wall 2 are spaced apart by a similar but, as shown, thinner ring member 5. All these parts are shown as secured together by means of the bolts 6. The casing thus is provided with a pair of substantially cylindrical chambers. In one of these chambers, as between the wall 1 and the partition 3, is positioned an annular piston member 10 and between the partition 3 and the wall member 2 is positioned an annular valve plate 11. Extending axially through the casing is a hollow shaft 15.

Where this shaft passes through the piston-containing chamber it may be provided with a squared portion 16 as shown best in Figure 10, provided at one end with an enlarged collar portion 17. Between this collar portion and a flanged collar 18 engaging a cylindrical portion 20 of the shaft adjacent to the squared portion 16 is an annular member 25 shown best in Figure 5 having a central rectangular opening 26. This opening is longer than the transverse dimension of the squared portion 16 to allow transverse adjustment of the member 25 lateral to the axis of the shaft, and it is also sufficiently wider than the squared portion to permit anti-friction bearing rollers 27 to be interposed therebetween. These bearing rollers, however, prevent motion between the shaft and the member 25 at right angles to the transverse motion first mentioned. The ring member 25 is provided with inwardly projecting posts 28 keyed thereto which extend through guiding openings 29 through the squared portion 16 and into contact with means by which the eccentricity of the ring member 25 may be adjusted with relation to the axis of the shaft 15 as will later appear. This ring member 25 has fixed to its periphery the inner raceway member 35 of an anti-friction bearing having rolling elements 36 which are arranged to bear between the raceway member 35 and an outer raceway member 37 carried on the inner face of the annular piston 10.

Means are provided by which the space between the piston 10 and the casing ring 4 may be divided into a plurality of expansible and contractible fluid pressure receiving chambers 50. As shown, this means comprises a plurality of partitions or vanes 45, each supported in a rocking bearing 46 in the ring member 4 and slidable between segmental bearing members 47 rockably seated in sockets 48 in the piston member 10. As the central shaft is rotated, this piston member is given a gyratory or orbital movement which causes it to alternately approach and recede from any particular point on the ring 4, thus to cause the chambers 50 to alternately increase and decrease in size progressively angularly around the shaft 15. Each of these chambers has in communication therewith a port 52 extending through the partition member 3. This partition member is also provided centrally with bearings as at 55 for supporting the shaft 15.

The means for varying the eccentricity of the piston, as before mentioned, comprising a rod 60 axially slidable through the shaft 15. As shown best in Figure 4 this rod is provided with oppositely disposed faces 61 and 62 arranged in parallel relation and extending at an angle to the axis of the shaft. These faces 61 and 62 are formed to bear on inclined end portions 63 of the post members 28 and in order to reduce friction as much as possible rollers 64 are interposed therebetween.

Recesses as 65 are formed in the bar 60 into which the pointed ends 66 of the elements 28 may extend when the bar 60 is moved to one or the other of its limits of traverse motion. For example, as shown in Figure 4, the point of the upper bar 28 extends into its recess 65, the bearing roller 64 being at the left hand end of the face 61. When the bar 60 is moved to its extreme left hand position, the point 66 of the lower bar 28 will likewise extend into the lower recess 65. By moving this bar 60 axially, therefore, it will be seen that the bars 28, and consequently the piston, will be moved transversely to the axis of the shaft, thus to vary the eccentricity of the piston and thereby to vary the extent of size variation of the chambers 50 between their maximum and minimum capacities.

As the eccentric wabbling or gyratory motion of the piston would of itself produce unbalanced forces in the mechanism tending to cause excessive vibration of the mechanism when in operation, means may be provided for counterbalancing such forces. As shown this means comprises a pair of counterbalance weights 70 and 71. The weight 70 is positioned on the shaft 15 outwardly of the end plate 1 which carries a bearing 72 for the shaft 15. The weight 71 is positioned beyond the end wall 2 which carries various other mechanisms which will later be described. The weight 71 is positioned axially considerably further from the chamber containing the piston 10 than is the weight 70. In view of this greater distance the weight 71 is made smaller than the weight 70 since it acts through a longer lever arm than the weight 70.

The weight 70, as shown best in Figure 2, is provided with an elongated opening 75 through which the shaft 15 passes so as to permit the weight to be moved transversely of the axis of the shaft. It is shown as provided with a pair of rods 76 adjustably secured as by threaded outer extremities 77 engaging in threaded sockets in the weight 70 and provided with check nuts at 78 to secure them in position and they are also prevented from turning axially as by means of screws 79, the inner ends of which ride in key slots 80 in the rods 76. The inner ends of these rods are formed inclined to the axis of the shaft and bear with interposed rollers 82 against inclined faces 83 on the rod 60 similar to the inclined faces 61 and 62 hereinbefore described, except reversely inclined, so that as the eccentricity of the piston 10 is changed in one direction, the eccentricity of the weight 70 is changed in the reverse direction.

The weight 71 is mounted on the shaft 15 similarly to the weight 70 and is arranged to be moved in the same direction simultaneously therewith and opposite to the direction of motion of the piston 10.

Means are provided for shifting the rod 60 axially while permitting it to rotate with the shaft 15 to which it is keyed by the eccentricity adjusting elements 28, 76 etc. extending through openings in the shaft and engaging flattened faces thereof. As shown, this means comprises a socket member 90 housing an anti-friction bearing 91 on the outer end of the rod 60 and provided with a closure plate 92 having a central opening through which the rod 60 rotatably extends.

This socket member 90, as shown best in Figure 3, is provided with a slotted extremity 94 within which rides a key block 95 in a stationary bearing 96 thus to keep the socket member 90 from rotating with the shaft 15 and the rod 60. Within this slot 94 may be pivoted the inner end of a link 97 connected to an arm 93 of a bell crank lever 99. To the opposite arm 100 of this bell crank lever 99 is attached a rod 101 by which it may be actuated. The arms of the bell crank lever are so angularly related as to produce any desired velocity ratio between the sliding of the rod 60 and the movement of the rod 101 and thus variation in eccentricity with the extent of motion of the rod 101 so as to produce any desired rate of slowing down or speeding up the discharge rate of the pump for a given extent of movement of the rod 101 from various positions. As shown, the mechanism is so proportioned as to give a small eccentric adjustment near minimum eccentricity and a larger eccentric adjustment near maximum eccentricity for the same extent of movement of the rod 101 so as to give a finer adjustment at low delivery speeds and in approximately geometric progression which is desirable for lathe spindles. When variable eccentricity in the motor is used this variable control would be reversed.

The valve plate 11 heretofore mentioned is mounted for eccentric orbital movement similarly to the piston 10 except that it is unnecessary to provide for variations in eccentricity. For this reason it is shown as having rotatable in a central opening therein an eccentric 110 which is keyed to the shaft 15 to rotate therewith and restrained from axial movement by a nut 111 threaded on the shaft and holding the eccentric against a shoulder 112 on the shaft.

The valve plate 11 is arranged with its eccentricity 90° out of phase with the eccentricity of the piston and is counterbalanced by reason of the opening 75 in the counterbalance weight 70 and the similar opening in the weight 71 being arranged sufficiently to one side of the center line of the weights.

It is desirable to provide means for tying the wall members 1 and 2 and the partition 3 together inwardly of their separating ring elements 4 and 5. To this end the piston 10 and the valve plate 11 may be provided with circular openings 120 through which may be extended tie bolts such as 121 between the end plate 1 and partition 3 through the piston 10 and bolts 122 extended through the end plate 2 and the openings through the valve and threaded into the partition 3. These bolts may be provided with collars 123 journaled thereon which may make rolling contact with the inner walls of their respective openings in the piston or valve plate when the piston is of maximum eccentricity, each of these bolts with its collar contacting with one side of the opening through which it passes during one angular position of the gyratory member and holding this member against rotation about its own axis.

In order to further control the motion of these members effective through the entire range of eccentric adjustment, I have found it desirable to employ short shafts as 125, three being shown extending through and journaled in the partition 3 and provided at their ends with crank pins 126 and 127 which are journaled in suitable openings in the piston 10 and the valve plate 11, respectively. In order to provide for the eccentric adjustment of the piston 10, eccentric adjustment between each crank pin 126 and its shaft 125 must be provided and this may be done conveniently by groove and tongue connections as at 128 between these parts which permit such relative motion. Similar tongue and groove connections are shown as placed between the shaft 125 and the crank pin 127 for the valve plate which permits the parts to adjust themselves to any inaccuracies of manufacture so that extreme accuracy in their manufacture and assembly is not required. This construction is shown in detail in Figure 14.

The end plate 2 outwardly of the valve member is shown as provided with a pair of concentrically arranged passages 140 and 141. The passage 140 leads out through the inner face of the end plate 2 through a series of ports 142 into the valve chamber and the passage 141 leads into the valve chamber through another series of ports 143 inwardly spaced and concentrically arranged relative to the ports 142. Through the outer face of the end plate 2 the passage 140 is provided with a single port 145 and the passage 141 is provided with a single port 146. These ports 145 and 146 both open into a valve chamber 148 (see Figures 12 and 13) within which is shown positioned an oscillatory valve 149 having an actuating shaft 150 secured thereto.

The valve chamber 148 has communicating therewith a pair of ports 152 and 153 with which may be joined pipes as 154 leading to opposite sides of the motor of the hydraulic system. Either of these ports 152 and 153 may be connected at will with either the port 145 or the port 146. As will later appear, the port 145 may be a high pressure port and the port 146 a low pressure or intake port for the pump. By connecting the port 145 to the port 153 as in the position of the valve shown in full lines in Figure 13, the fluid under pressure may pass through the port 153, the motor, and the port 152 back to the lower pressure side of the pump. If the valve member 149 is thrown to the position shown in dotted lines in Figure 13, the high pressure fluid is led out through the port 152, through the motor in the reverse direction, back through the port 153 and the port 146 to the intake side of the pump. In the position shown in Figure 12 both the ports 152 and 153 are closed so that the motor is cut off from the pump and the ports 145 and 146 are in open communication with each other so that the pump merely circulates the liquid through these ports. It will be seen by reference to Figures 12 and 13 that the valve 149 has an extension 160 having an opening in registry with the port 146, a strengthening web 161 being shown as extending across the valve but without blocking off its connection to its upper hollow portion 162 through which the port 145 may be connected to either of the ports 152 or 153 when the valve is swung to proper position. The discharge is around the outside of the valve as will be seen from an inspection of Figure 13. The outer portion of the valve chamber is closed off as by means of a cover plate 165 through which the valve actuating shaft 150 passes, the valve being slidable between this cover plate and the plate 2.

Means are also provided by which any air which may become entrained in the liquid in the system is removed therefrom and by which any leakage of fluids is made up and by which the liquid is cooled. To this end a fluid supply tank 170 may be provided, as shown in Figure 1, and this tank may act as a support for the pump mechanism, the bearing 96 for the delivery capacity regulating mechanism being shown as integral with one wall thereof and a top wall 171 thereof being shown as supporting the pump casing and having an upwardly extending flange 172 which may be engaged by one or more of the bolts 6 by which the casing is held assembled.

At 180 is shown a gear pump supported at the lower end of a foot 182 so as to extend below the level of liquid in the tank 170. This foot 182, besides housing the pump gears, also houses a vertical operating shaft 183 therefor which, on its upper end, has a spiral gear 184 fixed thereto and meshing with spiral gear teeth 185 cut into the shaft 15. The foot 182 is shown as supported in position by a bracket member 186 made fast to the outer face of the wall member 2, as by the screws 188. An intake pipe 190 leads from a suitable point in the tank, preferably remote somewhat from the pump, and a discharge pipe 193 leads from the pump 180 and opens into the low pressure passage 141 in the plate 2. Thus liquid is constantly supplied to the low pressure side of the pump. Any excess liquid which raises the pressure in this low pressure system to an undesirable degree is allowed to escape through a relief valve shown at 194 above the pipe 193 and seated in a suitable valve chamber shown as formed integral with the cover plate 165. This valve is pressed to its seat as by a spring 195 reacting against a plug 196 threaded into the valve casing, an exhaust port 198 for the liquid through which it may escape into the tank 170 being provided.

The high pressure passage 140 may also be provided with a relief valve as 200 mounted similarly to the valve 194 and having a relief passage 201 communicating with the relief passage 198.

The supply of liquid to the pump is preferably taken from a point remote to that receiving the escape past the relief valves since the liquid so escaping may contain air and be in a heated turbulent and somewhat frothy condition due to the churning it receives in going through the system. The intake for the pump 180 is therefore positioned to take the oil after it has had a chance to become settled and cool and to have lost any air which might be contained therein and has full opportunity to mix with the oil already in the pump before it can reach the relief valve 198. This pump 180 therefore produces a discharge through the relief valve which removes the air from the system therewith.

It is desirable to balance the pressure on opposite sides of the valve plate in order to reduce friction in its operation. To this end, the wall 2 has a recess 220 formed therein directly opposite each port 52 and connected at all times with that port. The recess is closed by the valve plate which forms with the walls of the recess a pressure chamber for liquid which acts upon the valve plate in opposition to the liquid in the port and thereby substantially hydrostatically balances the valve plate. Each recess 220 may be connected to the opposed port 52 in various ways and is shown connected thereto through an opening 225 formed in the valve plate.

Inwardly of these openings 225 the valve plate is provided with exhaust openings 230 which register with the low pressure passage 141 and at suitable times in the rotation of the shaft connect the low pressure passage with the ports 52 through the partition 3 which lead into the piston chambers, as shown, for example, in the position marked 123*a* in Figure 6.

Each port 52 is thus connected with the passages 140 and 141 alternately. When a port 52 is connected to the passage 140, liquid from the pump chamber 50 flows through the port 52 and past the edge of the valve plate into the passage 140, and a supplemental volume of liquid flows from the port 52 through the opening 225 and the recess 220 into the passage 140. When a port 52 is open to the passage 141, liquid from the passage 141 flows through the opening 230 and the port 52 into the pump chamber 50 and a supplemental volume of liquid flows from the passage 141 through the recess 220 and the opening 225 into the port 52.

The openings 225 thus provide additional channels for the flow of liquid to and from the pump chambers 50 and thereby reduce to a minimum the resistance to the flow of liquid.

From the foregoing description of an embodiment of this invention, it should be evident to those skilled in the art that various changes and modifications might be made without departing from the spirit or scope of this invention as defined by the appended claims.

I claim:

1. In a mechanism of the class described, a substantially cylindrical casing, a member within said casing extending between the end walls thereof, a rotary shaft extending axially through said casing, means for eccentrically supporting said member from said shaft to produce a gyratory motion of said member on rotation of said shaft, an eccentrically mounted counterbalance for said member, and means for varying the amount of eccentricity of said member and simultaneously therewith varying the eccentricity of said counterbalance to produce substantial balance in said mechanism.

2. In a mechanism of the class described, a substantially cylindrical casing, a shaft extending axially through said casing, a piston member within said casing and operatively connected to said shaft for eccentric movement on rotation of said shaft, means defining with said casing and member fluid chambers variable in capacity by angular movement of said shaft about its axis, and counter weights operatively associated with said shaft at opposite sides of said piston member and having their centers of gravity eccentrically disposed relative to said shaft oppositely to the eccentricity of said member, and means for simultaneously varying the eccentricities of said member and said weights.

3. In a mechanism of the class described, a substantially cylindrical casing, a rotary hollow shaft extending axially through said casing, a member within said casing, a rod extending through said shaft concentric therewith and having parallel face portions extending at an angle to its axis, elements from said member extending through openings in said shaft and bearing on said face portions, and means actuable to move said rod axially within said shaft thereby to move said elements axially and vary the eccentricity of said member relative to said shaft.

4. In a mechanism of the class described, a substantially cylindrical casing, a rotary hollow shaft extending axially through said casing, a disk member within said casing, a rod extending through said shaft concentric therewith and having parallel face portions extending at an angle to its axis, elements from said member extending through openings in said shaft and bearing on said face portions, means actuable to move said rod axially within said shaft thereby to move said elements axially and vary the eccentricity of said member relative to said shaft, a ring element within which said member is rotatably mounted, and means for preventing rotation of said ring member with said disk member and for causing orbital motion thereof by the eccentric motion of said disk member.

5. In a mechanism of the class described, a substantially cylindrical casing having closed end walls and a partition intermediate said walls, a shaft journaled axially of said casing and extending therethrough, an annular piston slidable between one of said end walls and said partition and connected to said shaft for a gyratory sliding movement on rotation of said shaft, a valve ring slidable between the other of said end walls and partition, means connecting said piston with said casing defining therewith chambers variable in capacity on angular motion of said shaft, said valve and partition having ports cooperating to admit fluid under pressure to said chambers on one side of said shaft, and to exhaust fluid from the chambers on the other side of said shaft, and means for preventing rotation of said piston and valve ring comprising a shaft journaled in said partition and having end crank portions journaled respectively in openings in said piston and valve ring.

6. In a mechanism of the class described, a substantially cylindrical casing having closed end walls and a partition intermediate said walls, a shaft journaled axially of said casing and extending therethrough, an annular piston slidable between one of said end walls and said partition and connected to said shaft for a gyratory sliding movement on rotation of said shaft, means for varying the amplitude of said movement, a valve ring slidable between the other of said end walls and said partition, means connecting said piston with said casing defining therewith chambers variable in capacity on angular motion of said shaft, said valve and partition having ports cooperating to admit fluid under pressure to said chambers on one side of said shaft, and to exhaust fluid from the chambers on the other side of said shaft, and means for preventing rotation of said piston and valve ring comprising a shaft journaled in said partition and having end crank portions journaled respectively in openings in said piston and valve ring, said piston crank portion having movable connection with said partition shaft to allow for variation in amplitude of gyratory movement of said piston.

7. In combination, a partition having ports for the passage of fluid under pressure, a wall member spaced from said partition, a valve plate slidable therebetween, admission and exhaust ports through said wall member with which said partition ports may be selectively connected by movement of said valve plate, said wall member having recesses opposite said partition ports and said valve plate having openings therethrough establishing communication between said recesses and said partition ports, thereby to equalize the pressure of said fluid on opposite sides of said valve plate.

8. In a mechanism of the class described, a substantially cylindrical casing having transverse wall members, a shaft journaled axially of said casing and extending through said wall members, a member slidable between said wall members and connected to said shaft for gyratory sliding movement on rotation of said shaft, means for varying the amplitude of said movement, and means for preventing rotation of said gyratory member with said shaft comprising a shaft journaled in one of said wall members and having a crank portion journaled in said rotary member, said crank portion having movable connection to its shaft to allow for variation in amplitude of gyratory motion of said slidable member.

9. In a mechanism of the class described, a substantially cylindrical casing having transverse wall members, a shaft journaled axially of said casing and extending through said wall members, a member slidable between said wall members and connected to said shaft for gyratory sliding movement on rotation of said shaft, means for varying the amplitude of said movement, and means for preventing rotation of said gyratory member with said shaft comprising a shaft journaled in one of said wall members and having a crank portion journaled in said rotary member, said crank portion and its shaft having slidable tongue and groove connections with each other to allow for variation in amplitude of gyratory motion of said slidable member.

10. In a vane type pump or motor provided with a casing having a piston chamber and a valve chamber arranged therein and a piston fitted in said piston chamber, the combination of a partition arranged between said chambers and having a plurality of ports formed therein in a circular series and providing communication between said chambers, a casing wall spaced from said partition to form said valve chamber and provided with an exhaust port and an intake port adjacent each partition port, and a valve plate fitted between said partition and said wall to control communication between said partition ports and said wall ports and operable to connect each partition port with the adjacent intake and exhaust ports selectively; said valve plate and said wall having a pressure chamber formed therebetween opposite each partition port and normally open to the opposite partition port to permit the fluid pressure prevailing in the partition ports to act upon both sides of said valve plate and thereby tend to hydrostatically balance said valve plate.

11. In a vane type pump or motor provided with a casing having a piston chamber and a valve chamber arranged therein and a piston fitted in said piston chamber, the combination of a partition arranged between said chambers and having a plurality of ports formed therein in a circular series and providing communication between said chambers, a casing wall spaced from said partition to form said valve chamber and provided with an exhaust port and an intake port adjacent each partition port and a recess opposite each partition port, a valve plate fitted between said partition and said wall to control communication between said partition ports and said wall ports and operable to connect each partition port with the adjacent intake and exhaust ports selectively, and means for connecting each recess to the opposed partition port to permit the fluid pressure prevailing in the partition ports to act upon both sides of said valve plate and thereby tend to hydrostatically balance said valve plate.

12. In a vane type pump or motor provided with a casing having a piston chamber and a valve chamber arranged therein and a piston fitted in said piston chamber, the combination of a partition arranged between said chambers and having a plurality of ports formed therein in a circular series and providing communication between said chambers, a casing wall spaced from said partition to form said valve chamber and provided with an exhaust port and an intake port adjacent each partition port, and a valve plate fitted between said partition and said wall to control communication between said partition ports and said wall ports and operable to connect each partition port with the adjacent intake and exhaust ports selectively; said valve plate and said wall having a pressure chamber formed therebetween opposite each partition port and said valve plate having openings extending therethrough each of which maintains communication between a pressure chamber and the opposed partition port to tend to hydrostatically balance said valve plate, and said pressure chambers and said openings being so positioned that upon said valve plate being operated to open one partition port to an adjacent wall port the opening communicating with that partition port will provide a second channel for the flow of liquid between those two ports.

13. In a vane type pump or motor provided with a casing having a piston chamber and a valve chamber arranged therein and a piston fitted in said piston chamber, the combination of a partition arranged between said chambers and having a plurality of ports formed therein in a circular series and providing communication between said chambers, a casing wall spaced from said partition to form said valve chamber and provided with an exhaust port and an intake port adjacent each partition port and a recess opposite each partition port, and a valve plate fitted between said partition and said wall to control communication between said partition ports and said wall ports and operable to connect each partition port with the adjacent intake and exhaust ports selectively; said valve plate having openings extending therethrough each of which maintains communication between a recess and the opposed partition port to tend to hydrostatically balance said valve plate, and said recesses and said openings being so positioned that upon said valve plate being operated to open one partition port to an adjacent wall port the opening communicating with that partition port will provide a second channel for the flow of liquid between those two ports.

WOLFGANG C. MULLER.